United States Patent [19]

Bingham et al.

[11] Patent Number: 4,521,809
[45] Date of Patent: Jun. 4, 1985

[54] METHOD AND APPARATUS FOR CONTROLLING ACCESS TO SELECTED TELEVISION PROGRAMS

[75] Inventors: Joseph P. Bingham, Fayetteville; Douglas J. Hatch, Chittenango, both of N.Y.

[73] Assignee: North American Philips Corporation, New York, N.Y.

[21] Appl. No.: 454,209

[22] Filed: Dec. 29, 1982

[51] Int. Cl.³ .................. H04N 7/16; H04K 1/02
[52] U.S. Cl. ...................... 358/120; 358/118
[58] Field of Search ..................... 358/118, 120

[56] References Cited

U.S. PATENT DOCUMENTS

| Re. 29,997 | 5/1979 | Toonder | 358/122 |
|---|---|---|---|
| 2,624,797 | 1/1953 | Lawson et al. | 358/145 |
| 3,313,880 | 4/1967 | Bass | 358/120 |
| 3,460,161 | 8/1969 | Waller et al. | 358/120 |
| 3,485,941 | 12/1969 | Bass | 358/120 |
| 4,367,557 | 1/1983 | Stern et al. | 358/118 |
| 4,398,214 | 8/1983 | Gargini | 358/118 |
| 4,434,436 | 2/1984 | Kleykamp et al. | 358/118 |

FOREIGN PATENT DOCUMENTS 148579  9/1983  Japan ..................... 358/120

Primary Examiner—S. C. Buczinski
Attorney, Agent, or Firm—Thomas A. Briody; William J. Streeter; Edward W. Goodman

[57] ABSTRACT

In order to control subscriber access to selected television programs in a CATV system, nonstandard horizontal synchronizing pulses, having a greater amplitude and either a higher or lower pulse repetition rate than the contained horizontal synchronizing pulses, are selectively added to those television programs to be controlled. As a result, the television receiver of a nonpaying subscriber interprets the nonstandard pulses as being valid horizontal synchronizing pulses thereby preventing the receiver from synchronizing its line scanning with that of the television program rendering the picture produced therefrom unviewable.

10 Claims, 3 Drawing Figures

METHOD AND APPARATUS FOR CONTROLLING ACCESS TO SELECTED TELEVISION PROGRAMS

BACKGROUND OF THE INVENTION

The invention relates to CATV systems, and more particularly, to CATV systems in which one or more programs are additionally supplied at a premium over those programs generally supplied.

CATV systems are known which provide various channels containing television programs for selective viewing by subscribers to the system. Of these various channels, one or more may be designated as premium channels for selective viewing by those subscribers who pay an additional amount for the privilege of viewing the programs on the premium channels. These programs may be in the form of first run movies, major sporting events, etc. Generally, these programs are scrambled at the cable supplier's head-end and subsequently descrambled at the paying subscriber's home in a device commonly referred to as a set-top converter.

The above type CATV systems have the drawback that when a paying subscriber defaults in his/her payments, access to that subscriber's home must be had in order to disable the descrambler thereby denying that subscriber access to the premium channels.

Moreover, since the descrambling is performed in equipment located inside the subscriber's home, these systems do not address themselves to the use of "bootleg" descramblers which are increasingly finding their way into the marketplace.

In addition, since the scrambling of the programs on the premium channels is effected from the head end of the system, the setting of the descrambler in each of the paying subscriber's homes must be very precise in order to assure satisfactory reception of the desired program.

Finally, these systems do not allow a subscriber having a "cable ready" television receiver to use the various tuning features of the receiver since the set top converter containing the descrambler performs all the tuning functions and provides, for the television receiver, the selected program on a single channel.

SUMMARY OF THE INVENTION

It is an object of the invention to provide, in a CATV system, a method and apparatus for controlling subscriber access to selected television programs which eliminates the need for accessing equipment in the subscribe's home.

It is a further object of the invention to provide, in a CATV system, a method and apparatus for selectively scrambling, for each subscriber, the television programs on said premium channels.

It is an additional object of the invention to provide, in a CATV system, a method and apparatus for selectively scrambling, for each subscriber, the premium television programs, which effectively thwarts the use of "bootleg" descramblers.

These objects are achieved in a method for controlling subscriber access to selected television programs, said programs having regularly spaced horizontal synchronizing pulses therein and being modulated onto separate carrier waves, each having a different carrier frequency, for transmission as individual channels over a controlled access transmission medium, characterized in that said method comprises the steps of generating oscillating signals having frequencies substantially equal to the respective carrier wave frequencies of the channels to be controlled and having amplitudes greater than that of the horizonatal synchronzing pulses; cycling said oscillating signals on and off to generate respective pulse signals in which the duration of said pulses are substantially equal to the duration of said horizontal synchronizing pulses, and the pulse repetition rates of said pulsed signals are either greater or less than that of said horizontal synchronizing pulses; and selectively combining said pulsed signals with the respective carrier waves carrying the programs to be controlled, whereby the television receiver of a subscriber not authorized to receive said respective programs, will interpret said superimposed pulsed signals as a valid horizontal synchronizing signal and throw itself out of synchronization with the relevant program, thereby rendered the received picture unviewable.

Apparatus for carrying out the above method is characterized in that it comprises means for generating oscillating signals having frequencies substantially equal to the respective carrier wave frequencies of the channels to be controlled and having amplitudes greater than that of said horizontal synchroninzing pulses; means for cycling said oscillating signals on and off to generate respective pulse signals in which the duration of said pulses are substantially equal to the duration of said horizontal sychronzing pulses, and the pulse repetition rates of said pulsed signals are either greater or less than that of said horizontal synchronizing pulses; and means for selectively combining said pulsed signals with said respective carrier waves carrying the programs to be controlled, whereby the television receiver of a subscriber not authorized to receive said respective programs, will interpret the superposed pulsed signals as the valid horizontal sychronizing signal and throw itself out of synchronization with the relevant program, thereby rendering the received picture unviewable.

DESCRIPTION OF THE DRAWINGS

With the above and additional objects and advantages in mind as will hereinafter appear, the invention will be described with reference to the accompanying drawing in which.

DESCRIPTION OF THE PREFERRED EMBODIMENT

Figure 1:
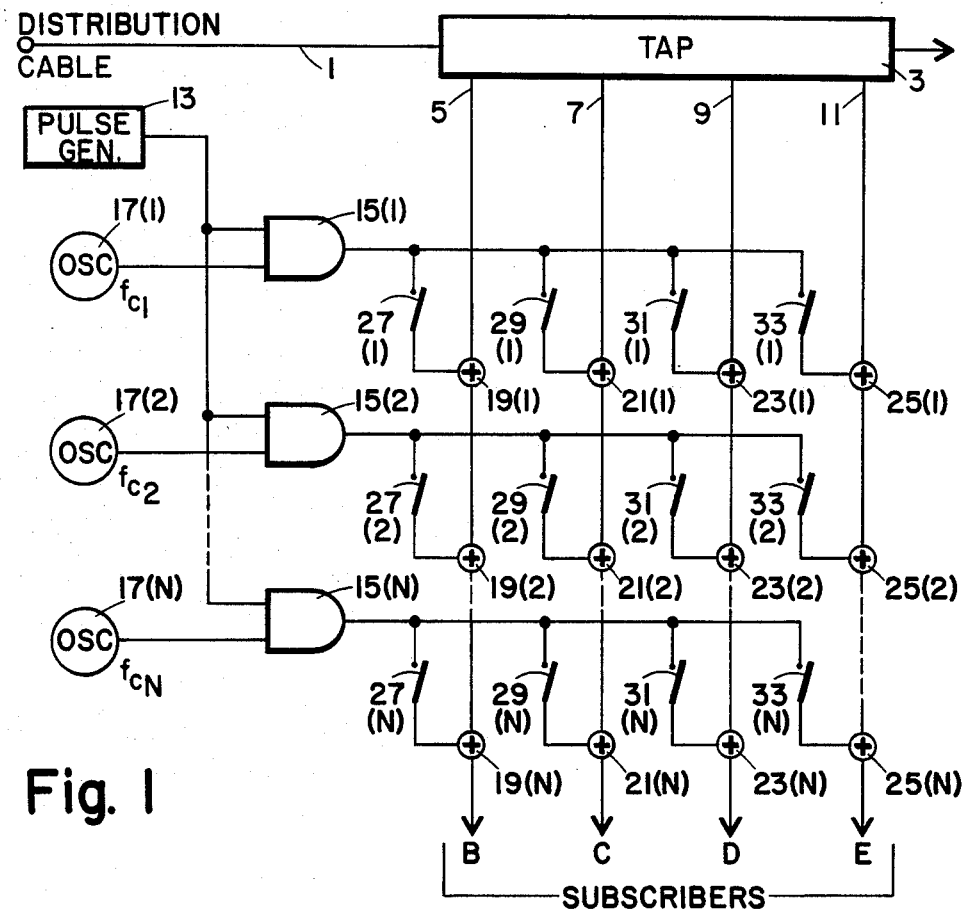
FIG. 1 is a schematic diagram showing a preferred embodiment of the invention.

Referring to FIG. 1, there is shown a CATV distribution cable having the reference number 1. The distribution cable 1 carries a plurality of channels of television programs transmitted from a CATV operator for reception by a plurality of subscribers to the system. As is typical, directional taps 3, having, for example four outputs 5, 7, 9 and 11, are coupled, at various points, to the distribution cable 1 to allow access to the television programs on the distribution cable 1 by each of the subscribers. The directional tap 3 may be a standard off the shelf item, for example, the MX-3700 series manufactured by Magnavox CATV Systems, Inc.

In a typical CATV system, the cable operator supplies to each subscriber, at a base fee, various channels of standard broadcast television programs generally receivable in the community along with several channels of original programs of community interest. In addition to the above, the cable operator may also provide one or more premium channels at additional fees for any of the subscribers. These premium channels may provide programs in the form of first-run uncut movies, major sporting events, home and away games of local major league sports teams, e.g. football, hockey, basketball, and baseball, broadway shows, etc. Since it is safe to assume that all subscribers may not want to receive and pay for all of the premium channels, the cable operator must have a way to selectively deny access to any of these premium channels by any of the subscribers.

Figure 2A:
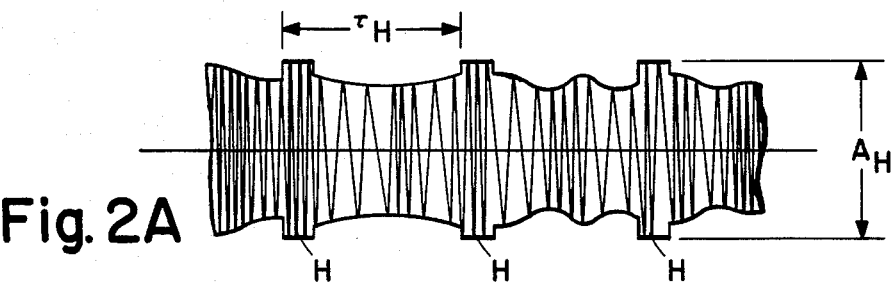
FIGS. 2a and 2b are respective waveforms found in the circuit of FIG. 1.

FIG. 2a shows a graph of a typical television signal having horizontal synchronizing pulses H at an amplitude $A_H$ therein. These pulses H are regularly spaced at intervals of $\tau_H$ and enable a television to synchronize its line scanning with that of the incoming signal. In recognition of this, the invention causes the television receiver to synchronize itself with an invalid horizontal synchronizing signal thereby preventing it from properly receiving the relevant television program. This invalid horizontal synchronizing signal is typically shown in FIG. 2b and includes pulses of a signal having a frequency substantially the same as the carrier frequency of the channel of the program to be controlled. While the duration of these pulses are the same as the valid horizontal synchronizing pulses H shown in FIG. 2a, the intervals between the invalid pulses are either greater or less than that of the pulses H while the amplitude A of the invalid pulses is greater than the amplitude $A_H$ of the pulses H. The invalid pulses are then added to the television signal and the combined signal is subsequently supplied to the nonpaying subscriber.

Figure 2B:
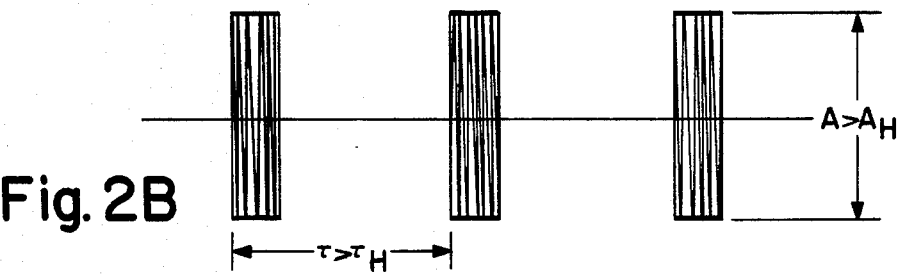

To this end, in FIG. 1 the apparatus of the present invention includes a pulse generator 13 for generating a pulse train having a pulse duration substantially the same as the horizontal synchronizing pulses H and a period of occurrence either greater or less than that of the horizontal synchronizing pulses H. The output of the pulse generator 13 is coupled to one of the inputs each of a series of N electronic switches shown in FIG. 1 as AND-gates 15(1), 15(2), . . . , 15(N), where N is an integer. The other inputs of gates 15 are coupled to respective oscillators 17(1), 17(2), . . . 17(N), having respective output frequencies $F_{c1}$, $F_{c2}$, . . . , $f_{cN}$ corresponding to the carrier frequencies of the channels to be controlled. Thus, under the control of the pulse generator 13, the outputs of the gates 15 carry pulse trains as represented in FIG. 2b, each pulse train having an amplitude A which is greater than the amplitude $A_H$ of the horizontal synchronizing pulses containing in the television signals. In order to assure the proper amplitude for the outputs of the gates 15, amplifiers (not shown) may be provided at the outputs of the respective gates 15.

As shown in FIG. 1, adder circuits 19(1), 21(1), 23(1) and 25(1) are coupled to the outputs 5, 7, 9 and 11, respectively, of the directional tap 3, and have inputs coupled, respectively, to one end of switches 27(1), 29(1), 31(1) and 33(1), the other ends of which are coupled to the output of gate 15(1). Similarly, the output of gate 15(2) is coupled to the outputs 5, 7, 9 and 11 of the tap 3 via respective adders 19(2), 21(2), 23(2) and 25(2) and respective switches 27(2), 29(2), 31(2) and 33(2). In like manner, the output of gate 15(N) is coupled to the outputs 5, 7, 9 and 11 via respective adders 19(N), 21(N), 23(N) and 25(N) and respective switches 27(N), 29(N), 31(N) and 33(N). The resultant television signal are then passed on to the subscribers B, C, D, and E.

In operation, when the cable operator chooses to deny a particular subscriber access to any of the premium channels, he merely closes the appropriate switch 27(N), 29(N), 31(N), 33(N) causing the invalid horizontal synchronizing pulses to be added to the appropriate television signal thereby rendering the television program unviewable by that particular subscriber.

Numerous alterations of the structure herein disclosed will suggest themselves to those skilled in the art. However, it is to be understood that the present disclosure relates to a preferred embodiment of the invention which is for purposes of illustration only and not to be construed as a limitation of the invention. All such modifications which do not depart from the spirit of the invention are intended to be included within the scope of the appended claims.

We claim:

1. A method for controlling subscriber access to selected television programs, said programs having regularly spaced horizontal synchronizing pulses therein and being modulated onto separate carrier waves, each having a different carrier frequency, for transmission as individual channels over a controlled access transmission medium, characterized in that said method comprises the steps:

generating oscillating signals having frequencies substantially equal to the respective carrier wave frequencies of the channels to be controlled and having amplitudes greater than that of the horizontal synchronizing pulses;

cycling said oscillating signals on and off to generate respective pulsed signals in which the duration of said pulses are substantially equal to the duration of said horizontal synchronizing pulses, and the pulse repetition rates of said pulsed signals differ from that of said horizontal synchronizing pulses; and selectively combining said pulsed signals with the respective carrier waves carrying the programs to be controlled, whereby the television receiver of a subscriber not authorized to receive said respective programs, will interpret said superimposed pulsed signals as valid horizontal synchronizing signals and throw itself out of synchronization with the relevant program, thereby rendering the received picture unviewable.

2. Apparatus for controlling subscriber access to selected television programs, said programs having regularly spaced horizontal synchronizing pulses therein and modulated onto separate carrier waves, each having a different carrier frequency, for transmission as individual channels over a controlled access transmission medium, characterized in that said apparatus comprises:

means for generating oscillating signals having frequencies substantially equal to the respective carrier wave frequencies of the channels to be controlled and having amplitudes greater than that of said horizontal synchronizing pulses;

means for cycling said oscillating signals on and off to generate respective pulsed signals in which the duration of said pulses are substantially equal to the duration of said horizontal synchronizing pulses, and the pulse repetition rates of said pulsed signals differ from that of said horizontal synchronizing pulses; and means for selectively combining said pulsed signals with said respective carrier waves carrying the programs to be controlled, whereby the television receiver of a subscriber not authorized to receive said respective programs, will interpret the superimposed pulsed signals as valid horizontal synchronizing signals and throw itself out of synchronization with the relevant program, thereby rendering the received picture unviewable.

3. Apparatus as claimed in claim 2, characterized in that said controlled access transmission medium comprises a distribution cable in a CATV system.

4. Apparatus as claimed in claim 2, characterized in that said oscillating signals generating means comprises separate oscillators having output frequencies corresponding, respectively, to the carrier wave frequencies of the channels containing the programs to be controlled.

5. Apparatus as claimed in claim 2, characterized in that said cycling means comprises a pulse generator coupled to the control inputs of respective switching means having respective inputs coupled to the outputs of said oscillating signals generating means.

6. Apparatus as claimed in claim 5, characterized in that said switching means comprises individual respective AND-gates having first inputs coupled to the outputs of said pulse generator and second inputs coupled respectively to the outputs of said oscillating signals generating means.

7. Apparatus as claimed in claim 2, characterized in that said combining means comprises respective switching means having one end coupled, respectively, to the outputs of said cycling means, and adder means for receiving the individual channels transmitted over said transmission means, having inputs coupled, respectively, to the other ends of said switching means.

8. Apparatus as claimed in claim 2, characterized in that said controlled access transmission medium comprises a distribution cable in a CATV system; said oscillating signals generating means comprises separate oscillators having output frequencies corresponding, respectively, to the carrier wave frequencies of the channels containing the programs to be controlled; said cycling means comprises a pulse generator and individual AND-gates, the output of said pulse generator being coupled to respective first inputs of said AND-gates and the outputs of said oscillators being coupled to respective second inputs of said AND-gates; and said combining means comprises respective switching means each coupled on one end to the respective outputs of said AND-gates, and adder means for receiving the individual channels transmitted over said distribution cable, having inputs coupled, respectively, to the other ends of said switching means.

9. Apparatus as claimed in claim 2, characterized in that the pulse repetition rates of said pulsed signals are less than that of said horizontal synchronizing pulses.

10. Apparatus as claimed in claim 2, characterized in that the pulse repetition rates of said pulsed signals are greater than that of said horizontal synchronizing pulses.

* * * * *